United States Patent [19]

Muto et al.

[11] 4,100,552
[45] Jul. 11, 1978

[54] RECORDING APPARATUS FOR A VOLTAGE SENSITIVE RECORDING SYSTEM

[75] Inventors: Hakaru Muto, Kamakura; Sadasuke Kurabayashi, Kawasaki; Yasushi Takatori, Machida; Isao Yamaguchi, Tokyo; Asao Watanabe, Higashi Kurume, all of Japan

[73] Assignee: Canon Kabushiki Kaisha, Tokyo, Japan

[21] Appl. No.: 711,208

[22] Filed: Aug. 3, 1976

[30] Foreign Application Priority Data

Aug. 7, 1975 [JP] Japan .................. 50-96206

[51] Int. Cl.² ............................................ G03G 17/00
[52] U.S. Cl. ...................................... 346/162; 346/154
[58] Field of Search ............... 346/162, 163, 154, 155, 346/164

[56] References Cited

U.S. PATENT DOCUMENTS

| | | | |
|---|---|---|---|
| 2,919,171 | 12/1959 | Epstein | 346/162 |
| 2,933,559 | 4/1960 | Campbell | 346/162 |
| 2,951,121 | 8/1960 | Conrad | 346/154 |
| 3,394,383 | 7/1968 | Lloyd | 346/154 |
| 3,564,556 | 2/1971 | Tsukatani | 346/154 |
| 3,732,573 | 5/1973 | Merka | 346/162 |
| 3,792,495 | 2/1974 | Bliss | 346/154 |
| 3,871,003 | 3/1975 | Kondo | 346/154 |

*Primary Examiner*—Jay P. Lucas
*Attorney, Agent, or Firm*—Fitzpatrick, Cella, Harper & Scinto

[57] ABSTRACT

A recording apparatus comprises a recording medium, a recording unit disposed in proximity to the recording medium for effecting recording on the recording medium by application of a voltage thereto, a first power source providing a voltage to be applied when recording is effected on the recording medium by the recording unit, a first switching unit provided between the recording unit and the first power source and being switchable in accordance with a voltage applied to its control terminal, a second power source having one end thereof connected to the junction between the switching unit and the first power source and effective to determine the voltage of a control signal applied to the control terminal, and an isolator for receiving recording signals to be applied to the switching unit.

16 Claims, 10 Drawing Figures a — SYNC. SIGNAL b — RECORDING SIGNAL

RECORDING APPARATUS FOR A VOLTAGE SENSITIVE RECORDING SYSTEM

BACKGROUND OF THE INVENTION

1. Field of the Invention

This invention relates to a recording apparatus which effects recording on a recording medium by applying a voltage thereto, and more particularly to a recording apparatus in which a high voltage is applied to the recording medium.

2. Description of the Prior Art

In a recording apparatus using recording paper, such as discharge breakdown paper on which a record may be made by application of a voltage thereto, recording electrodes are provided in opposed relationship with the recording medium and a high voltage is applied to such electrodes for a controlled period of time while the recording medium and the recording electrodes are moved relative to each other, whereby a desired record will be provided on the recording medium.

Such a recording apparatus produces little noise because it does not resort to the impacts imparted to the recording medium by character hammers, and it may thus be used as the recording apparatus for computer or as a facsimile receiver.

Such a recording apparatus, which is of the non-impact type as noted above, suffers less from the problem of noise production, but requires a high voltage to be applied to the recording electrodes during the recording.

Accordingly, the selector circuit for the recording electrodes requires a number of switching elements which may withstand the high voltage applied, and further requires a recording signal generating circuit for driving the switching elements and a plurality of different power sources having high voltages to be applied to the switching elements. This necessarily leads to an increased cost of the apparatus.

SUMMARY OF THE INVENTION

It is therefore an object of the present invention to present a recording apparatus which can be manufactured at a low cost.

It is another object of the present invention to present a recording apparatus which has a simplified power source circuit.

It is still another object of the present invention to present a recording apparatus which uses a decreased number of switching elements resistant to high voltages.

It is yet still another object of the present invention to present a recording apparatus having an increased recording speed.

Other objects and features of the present invention will become fully apparent from the following detailed description of the invention taken in conjunction with the accompanying drawings.

DESCRIPTION OF THE PREFERRED EMBODIMENTS

Before describing the present invention as embodied in an actual recording apparatus, a basic construction thereof will be explained with reference to FIG. 1.

Figure 1:
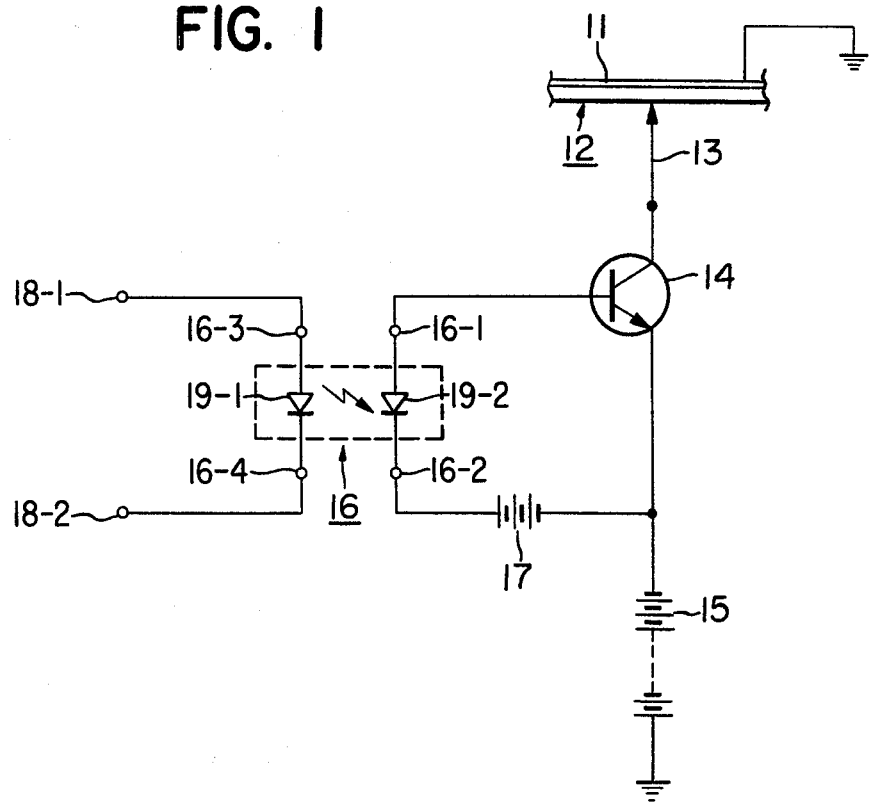
FIG. 1 is a circuit diagram showing a basic construction of the present invention.

In FIG. 1, reference numeral 12 designates discharge breakdown paper having a common electrode 11 or recording paper such as electrical recording paper, and such a common electrode is grounded to prevent a person from being electrically shocked when he touches it. Designated by 13 is a recording electrode disposed in contact with the recording paper 12. Connected to the recording electrode 13 is the collector electrode of a switching transistor 14, whose emitter electrode is connected to one end of a first power source of high voltage having the other end grounded. The voltage of the power source 15 must be sufficiently high to effect recording on the recording paper 12, and usually of the order of several tens to 200 volts, although this range may be varied depending on the characteristic of the recording paper 12. Connected to the base electrode of the transistor 14 is one output terminal 16-1 of an isolator 16 (such as Model 4350-514 produced by H.P., Inc.), and connected between the other output terminal 16-2 of the isolator 16 and the emitter electrode of the transistor 14 is a second power source 17. The voltage of the second power source 17 need be enough only to control ON-OFF switching of the transistor 14 and may thus be relatively low. The input terminals 16-3 and 16-4 of the isolator 16 are connected to recording signal input terminals 18-1 and 18-2, respectively.

Assuming that when digital signals comprising logics "0" and "1" are applied as recording signals from the input terminals 18-1 and 18-2 and the signal corresponding to the logic "1" is applied as an input, a diode 19-1 emits light and a diode 19-2 receives such light, then the voltage of the power source 17 is applied to the base electrode of the transistor 14 to turn on this transistor upon entry of the signal corresponding to the logic "1", so that the voltage from the power source 15 is applied between the common electrode 11 and the recording electrode 13, whereby a record corresponding to the configuration of the recording electrode 13 may be provided on the recording paper 12 by discharge or electrical energization.

When a signal corresponding to the logic "0" is applied between the input terminals 18-1 and 18-2, the diode 19-1 emits no light and thus, the voltage from the power source 17 is not supplied to the base electrode of the transistor 14, so that this transistor 14 is in its OFF state and no voltage is applied from the power source 15 to the paper between the common electrode 11 and the recording electrode 13.

In FIG. 1, as will be apparent from the foregoing, the power source 17 is provided in a floating-potential manner and may therefore be of a low voltage, as already noted.

Also, the bias may be set independently of the input terminals 18-1 and 18-2 since signals are received through the isolator.

Figure 2:
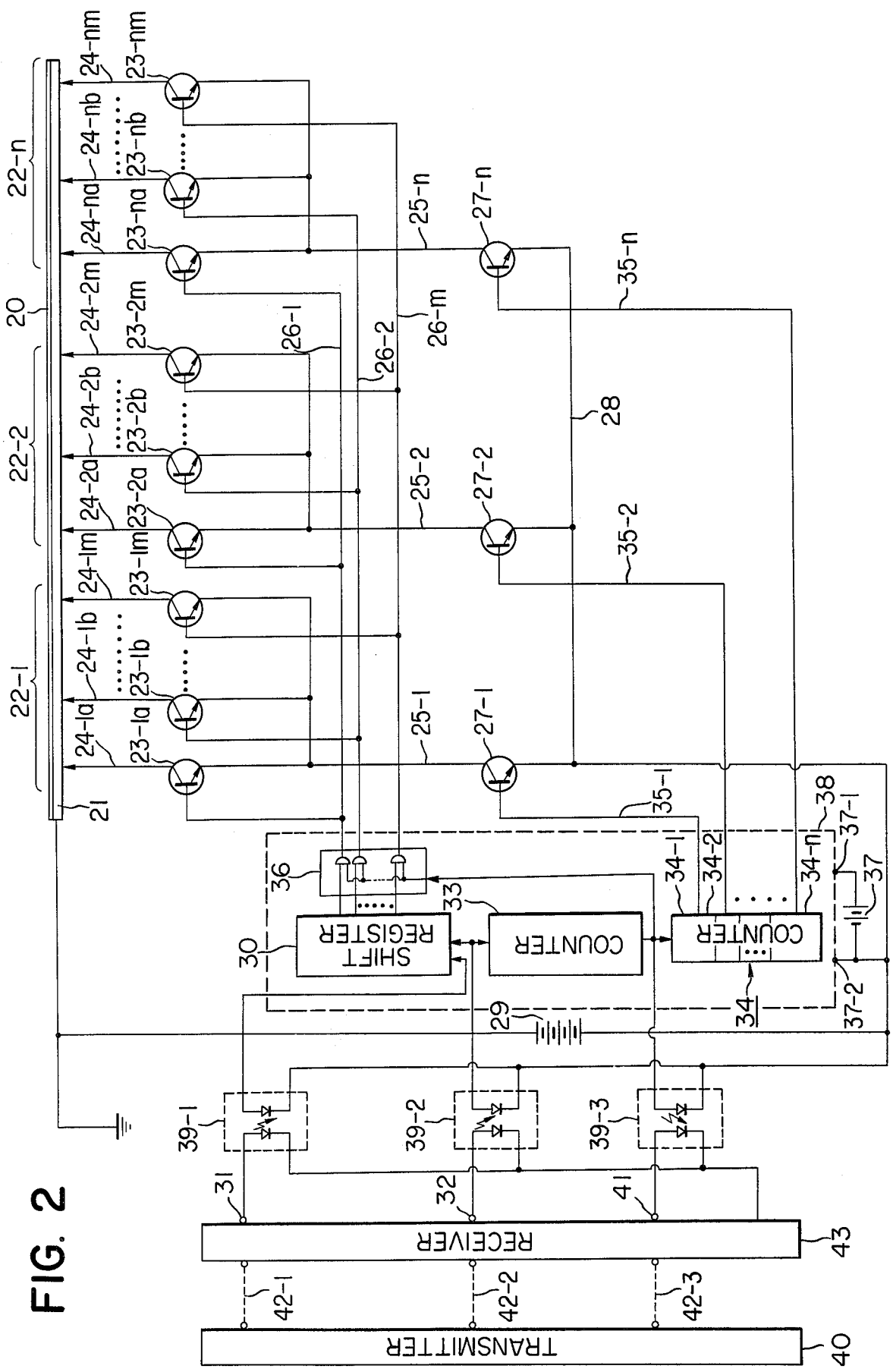
FIG. 2 is a circuit diagram showing the recording apparatus according to the present invention.

Reference will now be had to FIG. 2 to describe the present invention in greater detail with respect to an embodiment thereof. In FIG. 2, reference numeral 21 designates recording paper having a return electrode (common electrode) 20 in a portion thereof. The recording paper 21 has one surface thereof provided with groups 22-1, 22-2, . . . , 22-n comprising recording electrodes 24-1a to 24-1m, 24-2a to 124-2m, . . . , 24-na to 24-nm, thus totalling to $m \times n$ recording electrodes (for example, $m=128$ and $n=16$). Connected to respective ones of these recording electrodes are the collectors of first transistors 23-1a to 23-1m, 23-2a to 23-2m, . . . , 23-na to 23-nm, and the emitters of the transistors belonging to the groups 22-1, 22-2, . . . , 22-n are commonly connected to signal lines 25-1, 25-2, . . . , 25-n, respectively. Those of the transistors in said groups which correspond to one another have their base electrodes connected to common signal lines 26-1, 26-2, . . . , 26-n: for example, transistors 23-1a, 23-2a, . . . , 23-na have their base electrodes connected to a common signal line 26-1. On the other hand, signal lines 25-1, 25-2, . . . , 25-n are connected to the collectors of second transistors 27-1 to 27-n, whose emitter electrodes are connected to a signal line 28 and further to said return electrode 20 through a power source 29.

Designated by 30 is a shift register comprising a number of cascade-connected memory elements, which number is equal to the number $m$ of the recording electrodes forming one group, and thus the number of stages of this shift register is also $m$. The shift register 30 serves to read in recording signals applied from a terminal 31 through an isolator 39-1 in response to application of synchronizing signals (shift pulse) from a terminal 32 through an isolator 39-2, and the outputs of the $m$ stages of the shift register 30 are parallel-applied to said signal lines 26-1, 26-2, . . . , 26-n through a gate 36.

Designated by 33 is a counter which serves to count synchronizing signals the number of which is equal to the number of $m$ of the stages of the shift register 30, to thereby apply one pulse output to a counter 34 and also to the gate 36 to open this gate as long as such pulse output is applied thereto. Thus, the outputs of the respective stages of the shift register 30 are applied to the signal lines 26-1 to 26-m.

The counter 34 has stages 34-1, 34-2, . . . , 34-n corresponding to the number $n$ of said groups of recording electrodes, and the outputs of the respective stages are applied to the base electrodes of the transistors 27-1 to 27-n through signal lines 35-1 to 35-n. This counter may comprise a ring counter, for example, and derives the output only rom the stage corresponding to the counted value and turns on a transistor 27 to which such output is applied. For example, when the counter 34 involves "1", a transistor 27-1 is turned on and when the counter 34 includes "2", a transistor 27-2 is turned on.

The shift register 30, counters 33 and 34, and gate 36 are integrally formed into an integrated circuit 38 which constitutes a recording signal generating circuit. Such an integrated circuit is driven by a power source 37 and one end thereof is connected to the emitter of the transistor 27-1.

Although not shown for simplicity of illustration, power is supplied to the shift register 30, counters 33, 34 and gate 36 from terminals 37-1 and 37-2 connected to the power source 37.

Further, the output of the counter 33 is applied to a terminal 41 through an isolator 39-3.

Figure 3:
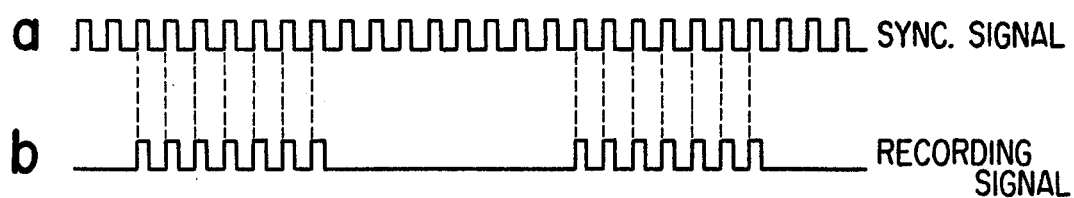
FIG. 3, consisting of FIGS. *a* and *b*, illustrates the waveforms of synchronizing signals and recording signals applied to the recording apparatus of FIG. 2.

The synchronizing signal as shown in FIG. 3a and the recording signal as shown in FIG. 3b (the latter signal being synchronous with the synchronizing signal) are transmitted from transmission lines 42-2 and 42-1 of a signal transmitter 40 to a receiver circuit 43, in which these signals are amplified and waveform-shaped, and then derived at terminals 31 and 32. An output derived at a terminal 41 is a signal which has been amplified and waveforc-shaped by the receiver circuit 40 and is to be returned to the signal transmitter 40. Such signal transmitter 40 and receiver circuit 43 do not directly pertain to the present invention and need not be described in detail.

Description will now be made of operation of the recording apparatus constructed as described above. The recording signals as shown in FIG. 3b, which are serially transmitted from the signal transmitter 40, are applied to the terminal 31, and the synchronizing signals transmitted from the transmitter simultaneously with the recording signals are applied to the terminal 32.

As already noted, the synchronizing signals are applied as shift pulse to the shift register 30, so that the recording signals are successively read in the shift register 30 and at the same time, the number of the synchronizing signals applied are counted by the counter 33.

When the number counted by this counter has become $m$, a pulse signal is delivered from the counter 33 to the counter 34 so that a signal is produced from the first stage 34-1 of the counter 34 and applied to the gate 36 to open the same. (The counter 33 produces no output pulse until it has counted $m$ synchronizing signals.) In such conditions, $m$ recording signals (dot signals) are stored in the register 30 and therefore, such recording signals are put out on the signal lines 26-1 to 26-m upon opening of the gate 36.

In the meantime, a group selecting signal is put out on the signal line 35-1 so that the transistor 27-1 is turned on to thereby connect the emitter electrodes of the transistors 23-1a to 23-am to the power source 29. Since the contents in the respective stages of the register 30 are parallel-applied to the base electrodes of these transistors 23-1a to 23-1m, so that the transistors to which high level recording signals (logic "1" signals) are being applied are turned on while the transistors to which low level recording signals (logic "0" signals) are being applied are turned off. Thus, the voltage of the power source 29 is applied to the recording electrodes 24-1a to 24-1m in accordance with the contents of said register, whereby recording is effected on the recording paper 21 by the recording electrodes 24-1a to 24-1m at a time.

In other words, discharge or electrical energization takes place only between the return electrode 20 connected to one end of the power source 29 and those of the recording electrodes 24 selected by the transistors 23, whereby recording takes place on the recording paper 21.

At the end of such recording, $m$ dot signals and synchronizing signals are again applied to the terminals 31 and 32 in succession. (In this manner, printing takes place upon application of $m$ dot signals and synchronizing signals and therefore, if such a design is made that all the dot signals and synchronizing signals are applied not at equal intervals but instead, $m$ dot signals and synchronizing signals are lumped in groups and such groups are intermittently applied, then printing may be effected at a considerably high speed even if a sufficient time is taken for the printing. Alternatively, it is possible to make such a design that the synchronizing signals and recording signals are applied from the signal transmitter 40 in a predetermined time after the pulse signal is put out by the counter 33 and applied to the signal transmitter 40.)

When the counter 33 thus begins counting, no output is produced from this counter until it has counter $m$, so that the gate 36 remains closed. The dot signals and synchronizing signals are thus continuously applied until $m$ synchronizing signals have been applied, whereupon the counter 33 produces an output and applies it to the counter 34 so that an output is produced from the second stage 34-2 of the latter counter while the gate 36 is opened.

As a result, the transistor 27-2 is turned on and the source voltage is applied to the recording electrodes 24-2a to 24-2m in accordance with the outputs of the respective stages of the register 30, whereby the recording corresponding to the contents of the shift register 30 is effected on the recording paper 21 by the recording electrodes 24.

When $m \times n$ dot signals and synchronizing signals have been so applied, a row of scanning by the recording electrodes 24-1a to 24-mn is completed and then, the recording paper 21 is somewhat displaced in a direction perpendicular to the plane of the drawing sheet (by unshown displacing means), whereafter an operation similar to that described above takes place again.

It is to be noted that the counter 33 is reset to "1" by a pulse applied after it has counted $m$ and that the counter 34 is reset to "1" by a pulse applied after it has counted $n$.

Again in the recording apparatus shown in FIG. 2, the positive voltage of the power source 29 is applied to the return electrode 20 of the recording paper 21, and the recording paper 21 is grounded to prevent the operator from being electrically shocked when touching the recording paper. The first power source 29 of high voltage ranging from several tens of volts to about 200 volts is connected between the ground and the emitters of the transistors 27, and the second power source is connected between said emitters and the integrated circuit 38. Since the second power source is provided in such a floated manner and the give-and-take of the signals is effected by the isolator, the power source for controlling the transistors 27 may sufficiently be of an extremely low voltage and the receiver circuit 43 and the power source may be independent of each other.

Also, in the present recording apparatus wherein the power sources are arranged in the manner as shown in FIG. 2, the transistors 27 for selecting the groups may be of sufficiently low resistance to the voltage and only the transistors 23 need have sufficient resistance to the power source 29.

More particularly, when both of the transistors 23 and 27 are turned on, the voltage drops in these transistors are sufficiently low and when the transistors 23 are turned on but the transistors 27 are turned off, all of the voltage is exerted on the transistors 23 and the collector voltage drop in the transistors 27 are sufficiently low.

Further, even if the transistors 23 remain in their ON state while the transistors 27 remain in their OFF state, the voltage applied to the collectors of the transistors 27 only differs from the emitter potential by an amount substantially corresponding to the source voltage of the power source 37.

In other words, the equivalent circuit in such a state becomes as if the bases of the transistors 27 were connected to the emitters thereof and the power source 37 were inserted between the bases of the transistors 23 and the emitters of the transistors 27 and thus, the emitter potential of the transistors 23 (in other words, the collector potential of the transistors 27) never becomes higher than the base potential of the transistors 23.

Accordingly, the potential between the collector and emitter of the transistors never becomes higher than the potential of the power source 37 and this means that the transistors 27 may be of low resistance to the voltage.

The recording paper on which recording is effected by the above-described recording apparatus may be, for example, the electrically energizable recording paper as disclosed in our U.S. application Ser. No. 598,144 now U.S. Pat. No. 4,067,780 entitled "Image Recording Member" invented by Takutoshi Fujiwara and Katsuhiko Nishide. Such recording paper usually exhibits a voltage-current characteristic as indicated by a curve $b$ in FIG. 4, wherein it will be seen that when the voltage applied becomes 100 to 200 volts, a current abruptly begins to flow to induce exposure and when the voltage exceeds 150 volts, discharge takes over the exposure to provide poor exposure. That is, the allowable range of the voltage applied is narrow and the stability of the power source is required.

Figure 4:
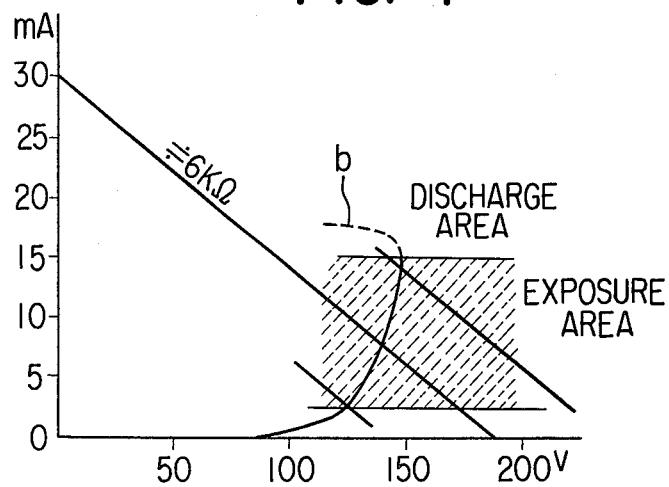
FIG. 4 is a graph illustrating the recording characteristic of electrical recording paper usable with the present invention.

To alleviate such requirements, a resistor RC may be inserted in series with each of the recording electrodes. If the resistor so inserted is of 6 K$\omega$, good recording may take place for a voltage between 130 and 250 volts, as seen in FIG. 4, but this is undesirable in that the loss due to the resistors is great and the transistors must be of high resistance to the voltage.

Figure 5:
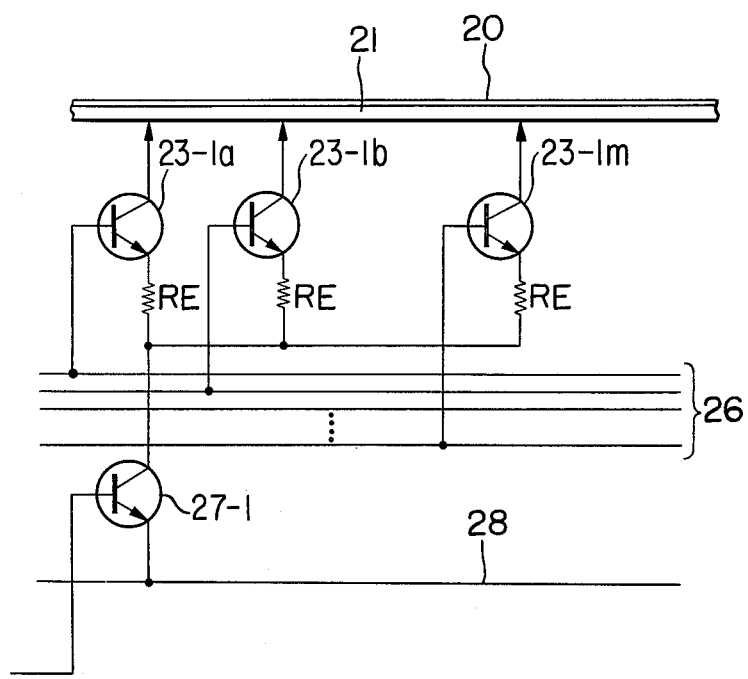
FIG. 5 is a circuit diagram showing essential portions of the recording apparatus endowed with a constant current characteristic.

According to the present invention, as shown in FIG. 5, a resistor RE instead of the resistor RC is inserted in series with the emitter of each of the recording electrode driving transistors 23 to effect the feedback of the current to the transistor to thereby provide a constant current characteristic and accomplish stable recording.

By varying the value of the constant current flowing to the transistors 23, the recording density on the recording paper may be varied and to achieve this, one end of each of the resistors equal in number to the signal lines 26 may be connected to respective one of the signal lines 26 and the other end may be commonly connected, and the voltage applied to the commonly connected ends of the resistors may be varied.

As regards the transistors 27, the current flowing through them is greatly deteriorated by each of the recording electrodes to which signals are applied and therefore, the constant current characteristic is not applicable to these transistors.

FIG. 5 shows only the essential portions of FIG. 2 and those portions not shown there are similar in construction to those in FIG. 2, and similar reference characters in FIG. 5 designate similar members in FIG. 2.

Figure 6:
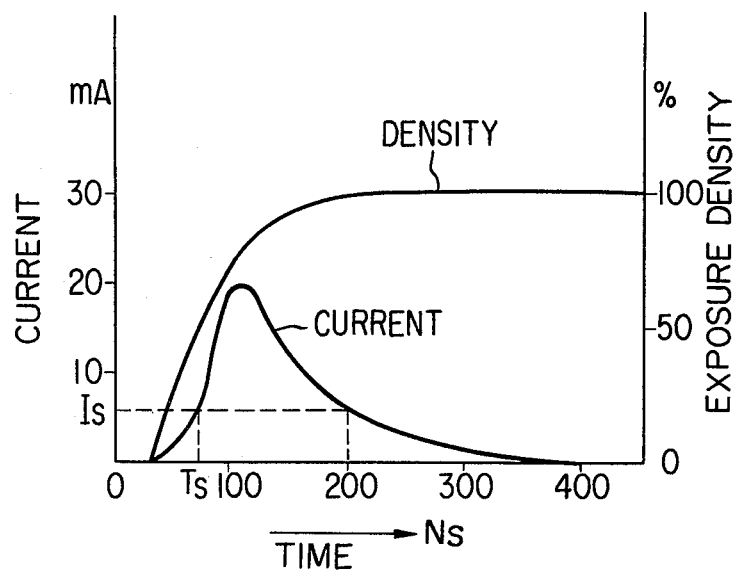
FIG. 6 is a graph illustrating the current applied to the electrical recording paper used with the present invention and the recording density thereon.

FIG. 6 illustrates the recording characteristic of the above-described electrical recording paper used with the present invention. As will be apparent, this recording paper is such that the recording current reaches its maximum in 100 μs after it has begun to flow and thereafter, the recording current decreases with time and becomes zero in about 400 μs.

Such a period of time required from the application of the voltage to the recording paper until the desired exposure is obtained, is variable by the manufacturing conditions of the recording paper, the environment in which it is used, the voltage applied, etc. Therefore, in designing the apparatus for use of such recording paper, it is necessary that the time during which the recording electrodes are supplied with power (supplied with recording signals) be selected to the vicinity of a maximum expected value, and this would necessarily reduce the total recording speed in the system whereby a number of recording electrodes are successively driven.

Figure 7:
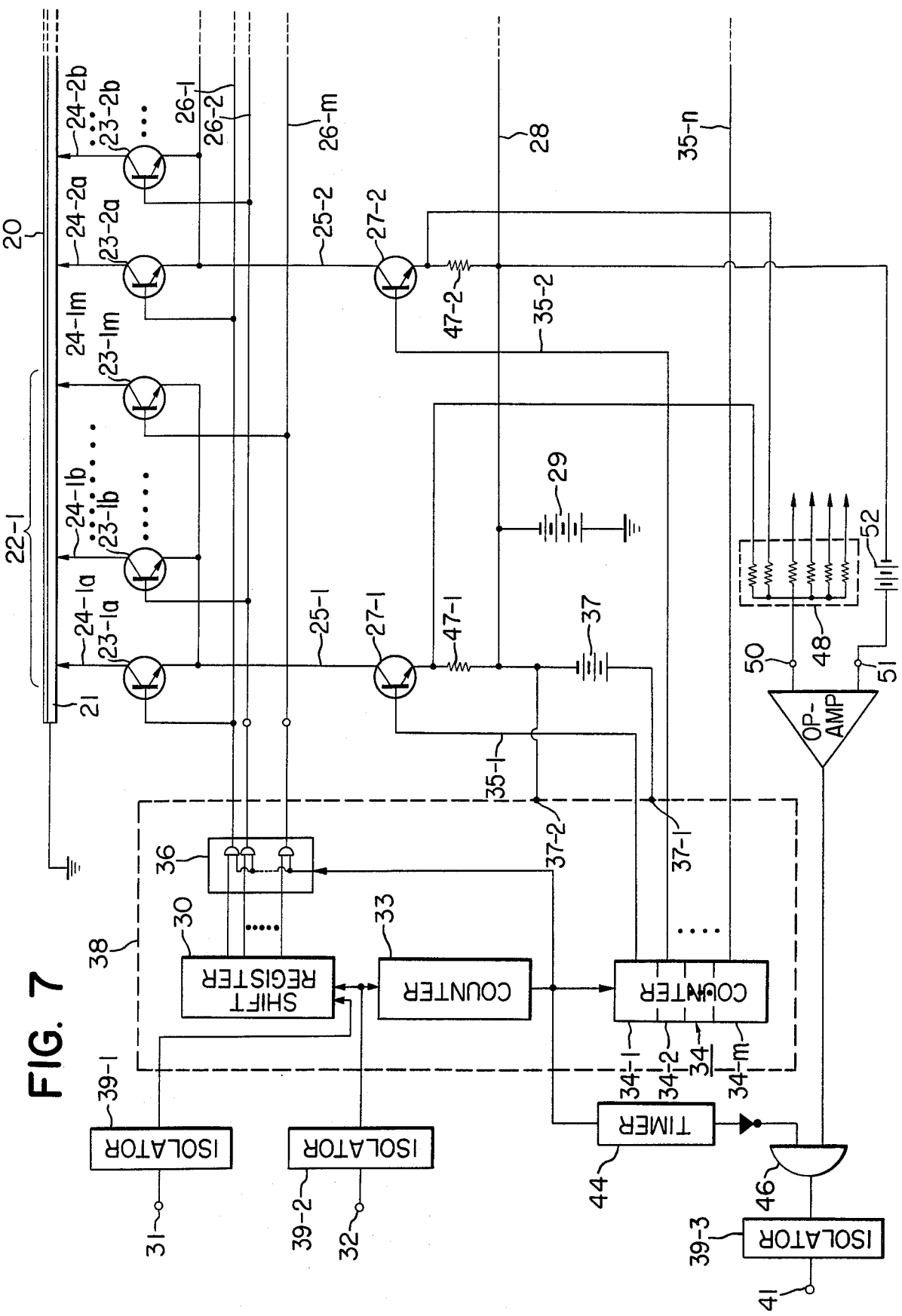
FIGS. 7 and 8 are circuit diagrams of the recording apparatus of the present invention having detector means for detecting the termination of desired recording.

For this reason, the present invention employs the construction as shown in FIG. 7 to reduce the time required to drive the recording electrodes.

More particularly, the construction in FIG. 7 is such that after a predetermined set time $ts$ has passed from the initiation of the recording by the recording electrodes (styluses), it is detected that the current flowing through the recording paper has reached a predetermined set value $Is$ (which is selected so that the exposure density reaches a desired value) and the signal transmitter is instructed to transmit to the recording apparatus the dot signals and synchronizing signals belonging to the next group to thereby eliminate the time of play in the shift from one group to another and when all of the dot signals belonging to a certain group are "0", the information for a further next group may be read in immediately.

The aforementioned time $ts$ may be of any length during which the current may exceed the set current value $Is$ after the initiation of the recording, but as already noted, the set time may be irregular depending on the recording paper and other conditions and therefore, the value of the set time should preferably be determined with some allowance (say, to the order of 100 μs for the recording paper as shown in FIG. 6), whereas too ample an allowance which will make the set time $ts$ exceed the length required for the current value to pass a peak value and again come down to $Is$ (in FIG. 6, more than 200 μs) would be less effective and thus, the time $ts$ should preferably be as short as possible within an allowable range.

FIG. 7 shows a recording time reducing device provided in the recording apparatus of FIG. 2. In this device, the output of the counter 33 reporting the initiation of application of the recording signals to the recording needles belonging to a certain group, for example, group 22-1, is applied to a timer 44 (one-shot multivibrator) having a holding time for the signal of the aforementioned set time $ts$, and the output of this timer is in turn applied through an inverter 45 to an AND gate 46. Thus, high level signals are applied to the AND gate 46 only after the time $ts$ has passed. On the other hand, resistors 47-1, 47-2, . . . , 47-n are provided to the emitters of transistors 27-1 to 27-n for selecting said groups, and the voltages resulting from the recording current flowing through such resistors are applied through OR gate 48 to one input terminal 50 of an operational amplifier 49.

A predetermined voltage from a reference voltage source 51 which produces a constant voltage is applied to the other input terminal 41 of the operational amplifier 49, which thus produces an output representing the comparison between the voltages applied to the two input terminals 50 and 51.

The reference voltage is set to a level substantially equal to the voltage resulting from the current $Is$ flowing through the resistor 47. The comparison output, which is negative when the voltage applied to the input 50 is higher than the reference voltage applied to the terminal 51 and which is positive when the voltage applied to the input 50 is lower than the reference voltage, is applied to the AND gate 46 to thereby drive the recording needles and when the current flowing through the recording paper passes its peak value and then reaches the set value $Is$, an end-of-recording signal may be provided from the AND gate 46. Such an end-of-recording signal is sent to the signal transmitter, not shown, to instruct it to transmit the dot signals and synchronizing signals belonging to the next group.

With such a construction, if all of the dot signals belonging to a certain group are "0" and when the aforementioned time $ts$ has passed, the output from the AND gate 46 immediately assumes high level and thus, immediately orders the recording of the signals belonging to the next group. Thus, the time during which such group is being selected may be very short.

In FIG. 7, those portions not shown are similar in construction to those in FIG. 2 and similar reference characters are similar in significance to those in FIG. 2.

Figure 8:
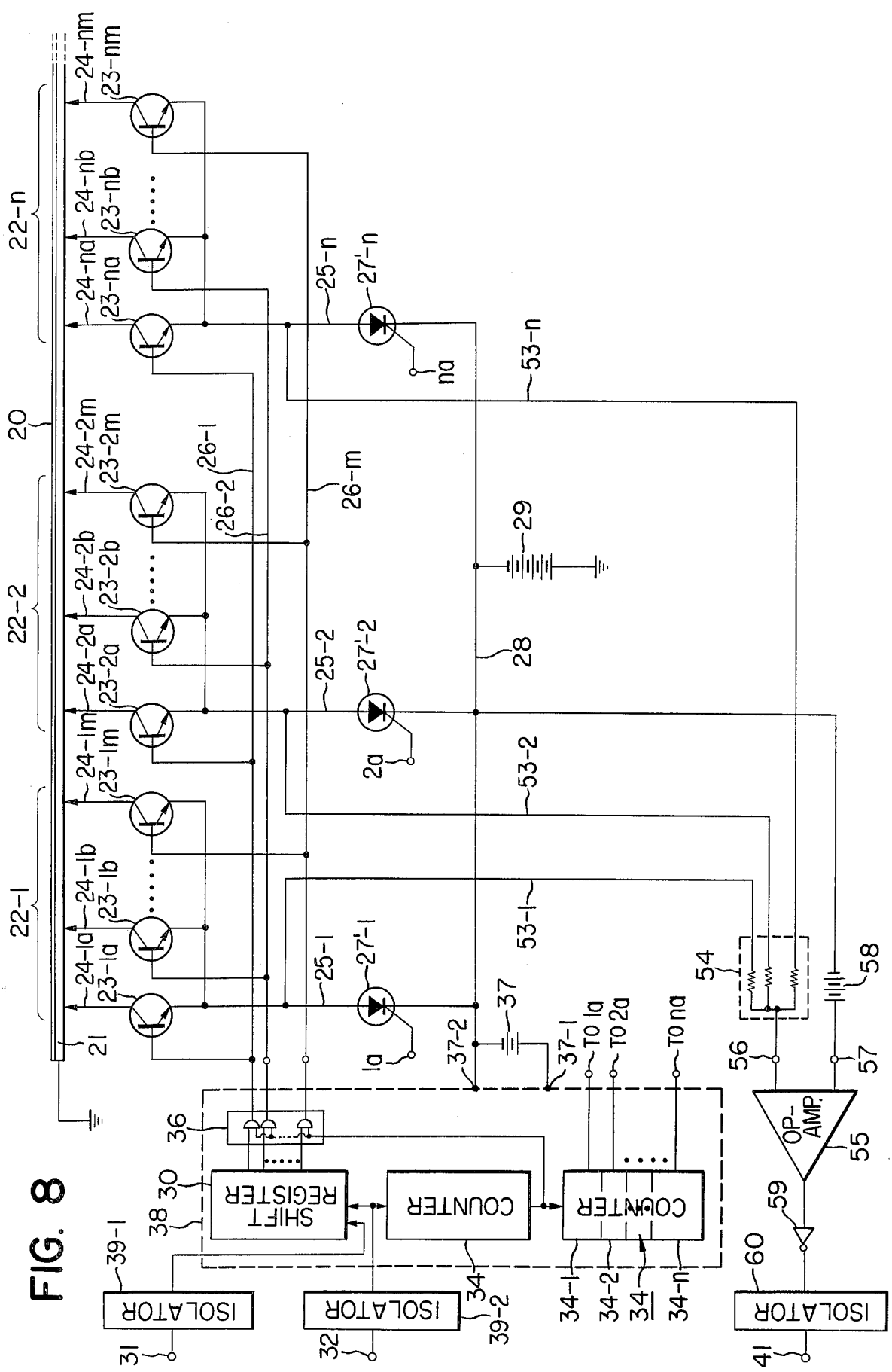

FIG. 8 specifically shows an application of the recording time reducing device shown in FIG. 7 to a recording apparatus using thyristors 27'-1, 27'-2, . . . , 27'-n in place of the transistors 27 for selecting the groups in FIG. 2. Where the thyristors 27'-1, 27'-2, . . . 27'-n are so used as the switching elements and the recording paper having the characteristic as shown in FIG. 6 is employed, the switching elements may be turned on by application of trigger pulse thereto and such an ON state may be maintained even after removal of the trigger pulse, unlike the case where transistors are used as the switching elements. However, because of the above-noted characteristic of the recording paper used, the current flowing through the recording paper is gradually decreased and when the anode potential of the thyristors has become lower than a predetermined value, the thyristors are turned off. Thereupon, the anode potential of the thyristors sharply rises and such anode potential is applied through signal lines 53-1, 53-2, . . . , 53-n to OR gate 54, the output of which is in turn applied to one input terminal 56 of operational amplifier 55 while the reference voltage from reference voltage source 58 is applied to the other input terminal of the operational amplifier 55, as already described in connection with FIG. 6.

Thus, when the thyristor 27' is in its OFF state, the operational amplifier 55 produces a negative output, which is inverted by inverter 59 and then applied to isolator 60, the output of which is applied to terminal 41, whereby an effect similar to that described in connection with FIG. 7 may be obtained.

Again in this case, if all of the signals applied to all recording needles in one group are logic "0", the next group selecting cycle is entered after lapse of the time $ts$, as already noted.

In FIG. 8, reference characters similar to those in FIG. 2 are similar in significance to those in FIG. 2 and those portions not shown are similar in construction to those shown in FIG. 2.

If, in FIG. 7, all the resistors 47 are of a predetermined value and if the number of recording needles in each group is very great, then the voltage drop due to the resistance will be so great that the apparatus will be derived of its practicability.

Figure 9:
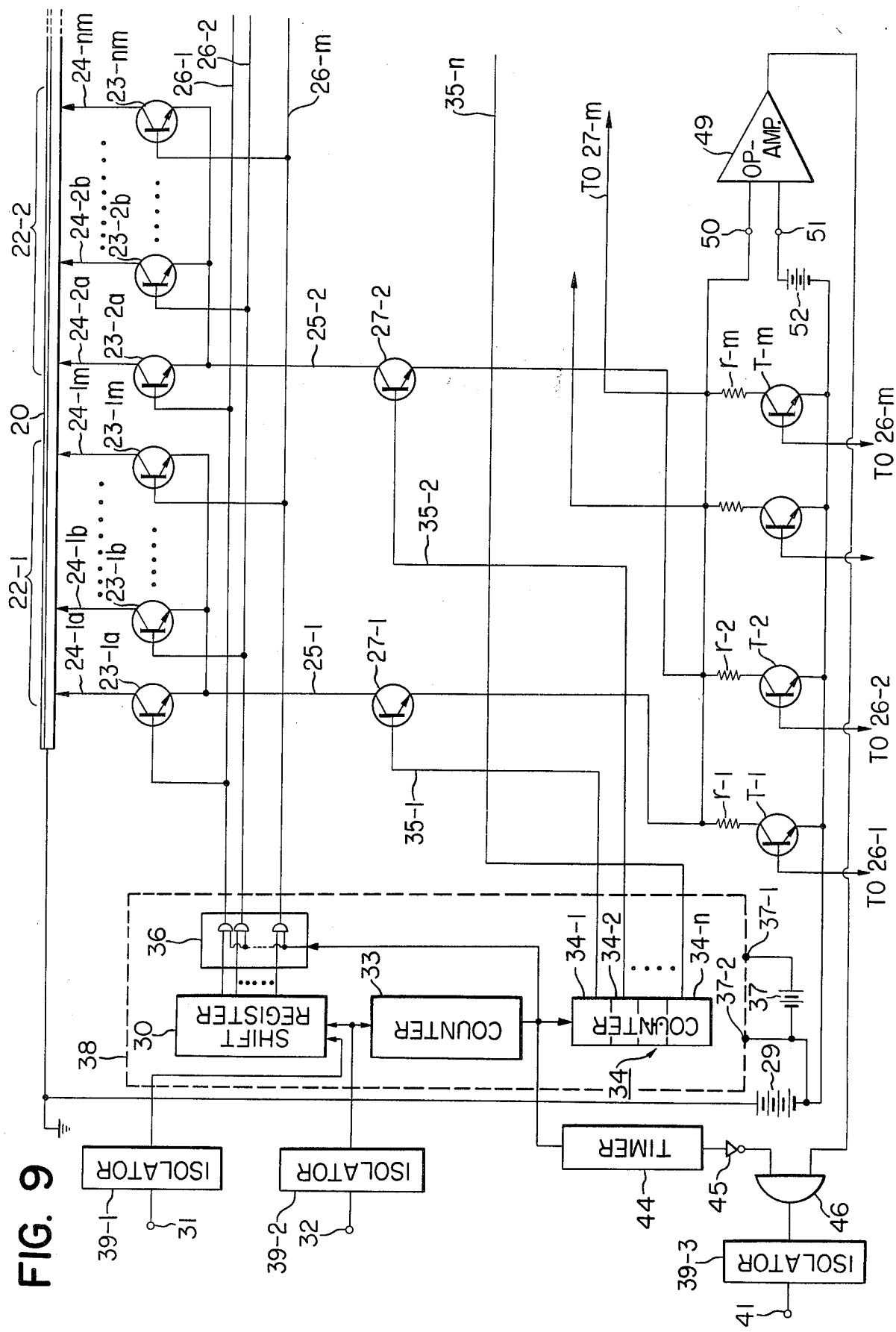
FIG. 9 is a circuit diagram of the recording apparatus according to the present invention which is designed to effect a predetermined recording operation independently of the number of recording electrodes selected.

Such a drawback may be eliminated by an arrangement as shown in FIG. 9, wherein transistors T-1 to T-$m$ are provided for switching respective resistors r-1 to r-$m$ provided in parallel relationship instead of the resistors 47-1, 47-2, . . . . , 47-$n$ in FIG. 7, and the base electrodes of the transistors are respectively connected to signal lines 26-1 to 26-$m$, whereby when the signals on these signal lines are logic "0", those of the transistors T-1 to T-$m$ to which such signals are applied are turned on and when the signals on these lines are logic "1", those of the transistors T-1 to T-$m$ to which such signals are applied are turned off.

Thus, when the high voltage is being applied to only one of the recording styluses in a certain group, namely, when the logic "1" signal is being applied to only one of the signal lines 26, $m$-1 resistors are parallel-inserted and when the logic "1" signal is being applied to two signal lines, $m$-2 resistors are parallel-inserted. Therefore, a resistance inversely proportional to the number of the recording styluses electrically energized may be automatically set, the voltage drop may be rendered to a fixed value and the detecting sensitivity may be enhanced.

Further, as in the case of FIG. 7, the voltage across each of such resistors is detected and compared with the reference voltage, whereafter a comparison output is provided by an operational amplifier. Again in this arrangement, a timer 44, an inverter 45, an AND gate 46 and a photocoupler 39-3 are of course connected in the same manner as shown in FIG. 7.

In FIG. 9, reference characters similar to those in FIGS. 2 and 7 are similar in significance to those in FIGS. 2 and 7 and those portions not shown are similar in construction to those shown in FIG. 2.

Figure 10:
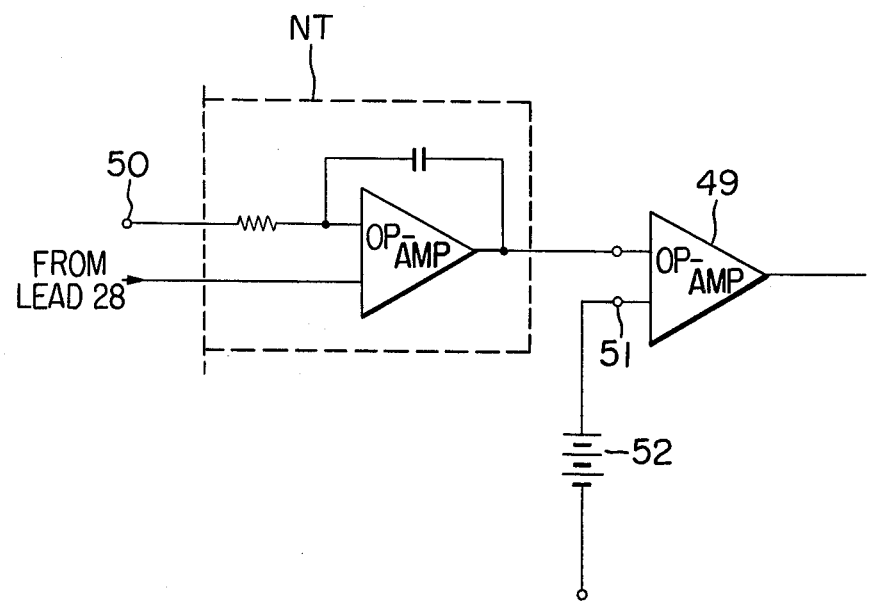
FIG. 10 is a circuit diagram showing major portions of the recording apparatus according to the present invention which has detector means for detecting a predetermined density of recording having been effected.

A further feature of the present invention is that an integrator NT as shown in FIG. 10 is inserted between the terminal 50 of the operational amplifier 49 and the operational amplifier 49 shown in FIG. 9, in view of the fact that the exposure density on the recording paper is proportional to the quantity of power consumed by the recording paper.

Such a construction makes it possible that when the quantity of power passed has exceeded a predetermined value, namely, when the recording paper has provided a predetermined density, the recording is discontinued and next information is read in.

What is claimed is:

1. A recording apparatus comprising:
 a recording medium;
 recording means disposed in proximity to said recording medium for effecting recording on said recording medium by application of a voltage thereto;
 a first switching element having two switching terminals and a control terminal, one of said switching terminals being connected to said recording means;
 a second switching element having two switching terminals and a control terminal, one of said switching terminals being connected to the other switching terminal of said first switching element, and said second switching element having a lower withstanding voltage requirement than that of said first switching element;
 recording signal generating means for generating recording signal voltages to be applied to the control terminals of said first and second switching elements;
 a first power source connected to the other switching terminal of said second switching element, the voltage of said first power source being sufficient to effect recording on said recording medium by being applied thereto; and
 a second power source connected between the other switching terminal of said second switching element and said recording signal generating means, the voltage of said second power source being used to provide the said recording signal voltages applied from said recording signal generating means to the control terminals of said first and second switching elements.

2. A recording apparatus according to claim 1, wherein said recording medium has an electrode surface, and further comprising means for maintaining said electrode surface at ground potential, and means for maintaining one side of said first power source at ground potential.

3. A recording apparatus according to claim 1, further comprising an isolator for introducing therethrough recording signals and synchronizing signals into said recording signal generating means.

4. A recording apparatus according to claim 3, wherein said recording signal generating means has converter means for converting serially introduced recording signals into parallel recording signals.

5. A recording apparatus according to claim 4, wherein said recording signal generating means has a counter for counting the synchronizing signals.

6. A recording apparatus according to claim 5, wherein a resistor is inserted between said first and said second switching elements.

7. A recording apparatus according to claim 4, further comprising detector means for detecting that the current flowing through said recording means has become lower than a predetermined value.

8. A recording apparatus comprising:
 a recording medium having an electrode surface;
 a plurality of recording electrodes disposed in proximity to said recording medium for effecting recording on said recording medium by application of a voltage thereto;
 a plurality of first switching elements each having a pair of switching terminals and a control terminal, one of said switching terminals of each said pair being connected to a respective one of said recording electrodes, said first switching elements being grouped into a plurality of sets;
 a plurality of first signal lines to which are respectively connected the other switching terminals of said first switching element belonging to respective ones of said sets;
 a plurality of second signal lines to which are commonly connected the corresponding control terminals of said first switching elements from respective ones of said sets;
 a plurality of second switching elements each having a pair of switching terminals and a control terminal, one of said switching terminals, of each said pair being connected respectively to said first signal lines, wherein each of said second switching elements has a lower withstanding voltage requirement than that of each said first switching elements;

a first power source having one end connected to the electrode surface of said recording medium and the other end connected to the other switching terminals of said second switching elements;

recording signal generating means for generating signals to be applied to said first and second signal lines; and a second power source for driving said recording signal generating means, said second power source having one end connected to the other end of said first power source.

9. A recording apparatus according to claim 8, wherein said recording signal generating means has parallel output means for applying the recording signals to said second signal lines one at a time.

10. A recording apparatus according to claim 9, wherein a resistor is connected to the other terminal of each of said first switching elements.

11. A recording apparatus according to claim 9, further comprising detector means for detecting whether the current flowing through said recording means has become lower than a predetermined value.

12. A recording apparatus according to claim 9, further comprising resistor selecting means for selecting the value of the resistor inserted between each of said second switching elements and said first power source, in accordance with the number of the recording electrodes forming said sets which are driven.

13. A recording apparatus according to claim 9, further comprising integration detecting means for detecting that the integral value of the current applied to said recording electrodes has reached a predetermined value.

14. A recording apparatus comprising:
a recording medium having electrode surface;
a plurality of recording electrodes disposed in proximity to said recording medium for effecting recording on said recording medium by application of a voltage thereto;
a plurality of first switching elements each having a pair of switching terminals and a control terminal, one of said switching terminals of each said pair being connected to a respective one of said recording electrodes, said first switching elements being grouped into a plurality of sets;
a plurality of first signal lines to which are respectively connected the other switching terminals of said first switching elements belonging to respective ones of said sets;
a plurality of second signal lines to which are commonly connected the corresponding control terminals of said first switching elements from respective ones of said sets;
a plurality of second switching elements each having switching terminals and a control terminal, one of said switching terminals of each said pair being connected respectively to said first signal lines, wherein each of said second switching elements has a lower withstanding voltage requirement than that of each said first switching element;

a first power source having one end connected to the electrode surface of said recording medium and the other end connected to the other switching terminals of said second switching elements;

recording signal generating means for generating signals to be applied to said first and second signal lines, said recording signal generating means comprising:

a shift register for reading in the recording signals introduced with the synchronizing signals by using said synchronizing signals as shift pulses;

means for detecting a predetermined number of synchronizing signals having been introduced to put out the output of said shift register on said second signal line; and selector means for successively applying selection signals to the control terminals of said second switching elements each time the predetermined number of synchronizing signals are introduced; and a second power source for driving said recording signal generating means, said second power source having one end connected to the other end of said first power source.

15. A recording apparatus comprising:
a recording medium;
recording means disposed in proximity to said recording medium for effecting recording on said recording medium by application of a voltage thereto;
a first switching element having two switching terminals and a control terminal, one of said switching terminals being connected to said recording means;
a second switching element having two switching terminals and a control terminal, one of said switching terminals being connected to the other switching terminal of said first switching element;
recording signal generating means for generating recording signals having voltages to be applied to the control terminals of said first and second switching elements;
a first power source connected to the other switching terminal of said second switching element, the voltage of said first power source being sufficient to effect recording on said recording medium by being applied thereto;
a second power source connected between the other switching terminal of said second switching element and said recording signal generating means, the voltage of said second power source being used to provide said recording signal voltages applied from said recording signal generating means to the control terminals of said first and second switching elements; and
an isolator for applying therethrough recording signals and synchronizing signals to said recording signal generating means.

16. A recording apparatus according to claim 15, wherein said isolator comprises an electroluminescent diode and a photosensitive diode.

* * * * *

UNITED STATES PATENT OFFICE
CERTIFICATE OF CORRECTION

Patent No. 4,100,552  Dated July 11, 1978

Inventor(s) HAKARU MUTO, et al.

It is certified that error appears in the above-identified patent and that said Letters Patent are hereby corrected as shown below:

Column 3, line 23   Change "124-2m" to --24-2m--.

Column 3, line 66   Change "rom" to --from.

Column 4, line 23   Change "wavefore-shaped" to --waveform-shaped--.

Column 6, line 43   Change "6 K$\omega$" to --6 K$\Omega$--.

Signed and Sealed this

Twenty-sixth Day of December 1978

[SEAL]

Attest:

RUTH C. MASON
Attesting Officer

DONALD W. BANNER
Commissioner of Patents and Trademarks